United States Patent [19]
Baumann

[11] Patent Number: 5,922,196
[45] Date of Patent: Jul. 13, 1999

[54] LIQUID FILTER WITH CONNECTION FLANGE

[75] Inventor: Dieter Baumann, Greven-Gimbte, Germany

[73] Assignee: Ing. Walter Hengst GmbH & Co. KG

[21] Appl. No.: 08/860,259

[22] PCT Filed: Sep. 14, 1996

[86] PCT No.: PCT/EP96/04044

§ 371 Date: Aug. 15, 1997

§ 102(e) Date: Aug. 15, 1997

[87] PCT Pub. No.: WO97/16234

PCT Pub. Date: May 9, 1997

[30] Foreign Application Priority Data

Oct. 27, 1995 [DE] Germany ............................ 195 39 918

[51] Int. Cl.$^6$ .................................................. B01D 35/02
[52] U.S. Cl. ........................ 210/232; 210/248; 210/443; 210/450; 123/196 A
[58] Field of Search .................................. 210/168, 171, 210/232, 248, 249, 428, 433.1, 440, 443, 444, 450, 462; 123/196 A

[56] References Cited

U.S. PATENT DOCUMENTS

| | | | |
|---|---|---|---|
| 2,633,991 | 4/1953 | Beatty | 210/249 |
| 4,824,564 | 4/1989 | Edwards et al. | 210/248 |
| 4,904,382 | 2/1990 | Thomsen | |
| 5,049,269 | 9/1991 | Shah | |
| 5,281,330 | 1/1994 | Oikawa et al. | 210/440 |
| 5,538,626 | 7/1996 | Baumann | 210/440 |

FOREIGN PATENT DOCUMENTS

| | | |
|---|---|---|
| 0 408 377 A2 | 1/1991 | European Pat. Off. . |
| 0 653 234 A1 | 5/1995 | European Pat. Off. . |
| 34 09 219 A1 | 3/1984 | Germany . |
| 9411212 U | 10/1994 | Germany . |

Primary Examiner—Matthew O. Savage
Attorney, Agent, or Firm—Hill & Simpson

[57] ABSTRACT

A filter for filtering lubricating oil or fuel for an internal combustion engine is disclosed herein. The filter includes a filter housing having an inner end for connection to a connection flange associated with the internal combustion engine and an outer end connected to a detachable cover. The inner end of the housing includes a filter inlet duct, a filter return duct, and a plurality of coaxially spaced radial filter seals for providing a seal between the filter housing and the connection flange. The connection flange includes a connection inlet duct in matching registry with the filter inlet duct, a connection return duct in matching registry with the filter return duct, and a plurality of coaxially spaced sealing surfaces each in matching registry with a respective one of the radial filter seals. A locking connection is provided for securing the filter housing against the connection flange at a plurality of said angular positions with respect to the connecting flange.

10 Claims, 6 Drawing Sheets

LIQUID FILTER WITH CONNECTION FLANGE

This application is a continuation-in-part of PCT Application No. PCT/EP96/04044, filed on Sep. 14, 1996.

BACKGROUND OF THE INVENTION

The present invention relates to a liquid filter, in particular for oil or fuel in an internal combustion engine, and a suitable engine-side filter connection flange.

A first liquid filter and a suitable filter connection flange are known from DE-U 94 11 212. In this case the liquid filter comprises a front-side circular groove at the front wall facing the filter connection flange with an axial sealing ring inserted in the groove. With this front wall, the liquid filter is pressed at a corresponding sealing surface of the filter connection flange. In this filter the pressing force is exerted by a hollow fastening screw bolt arranged in the interior of the filter housing with the screw bolt screwed together with a connection piece with an outer thread forming a part of the filter connection flange.

It is a disadvantage of this known liquid filter that the filter housing at least in the area of the front wall thereof is relatively rigid and thereby heavy in order to guarantee the necessary power transfer from the center screw bolt to the radially outwards positioned sealing without distortion or damage to the filter housing over a long period of time. This power transfer is necessary for the axial sealing. When selecting the material for the filter housing, one is restricted to metals, because plastic materials are not able to handle with the necessary stresses. Furthermore, the mounting of the known liquid filter on the engine-side filter connection flange is relatively cumbersome because the fastening screw bolt is positioned deeply in the interior of the filter housing and thus the handling with a wrench or tool is difficult.

Additionally from the DE 34 44 267 A1 a liquid filter with a housing receiving a filter insert is known, with the housing comprising a base member or socket with an inlet and drain for liquid to be filtered and wherein the socket is designed as a heat exchanger. Beside passages for the liquid to be filtered with a drain duct centrally arranged in the base member and extending across the total height thereof the socket comprises also adjacent further ducts for the heat exchanger fluid. Therein the liquid to be filtered is guided in an annular duct area within the socket concentric with the drain duct. Two further concentric annular ducts are arranged on both sides of the annular duct area. The base member or socket consists of two members sealed against each other and inserted into each other wherein the sealing is attained by several concentric radial seals. Regarding the mounting of the liquid filter at an associated engine, e.g. the internal combustion engine of a passenger car, a flat filter connection flange is provided at the engine-side and a mirror symmetric connection flange of the filter housing is to be biased against the flat filter connection flange with a flat axial sealing inbetween.

Also with this known liquid filter there is the requirement that the filter housing in the area of the connection flange has to comprise a high strength in order to guarantee a continuous seal of the flange connection during operation. All materials having the tendency to deform under the influence of temperature and pressure therefore disadvantageously cannot be used in this known liquid filter for the housing thereof in particular for the base member or socket.

From the DE 36 25 764 C1 a lube oil filter for internal combustion engines with a replaceable filter insert is known. In this filter the filter housing receiving the filter element is formed as a disposable unit which is firmly connected with the housing main member containing the inlet and drain ducts by means of a center screw bolt extending through the disposable unit. In order to guarantee a replacement of the seals when replacing the filter element the disposable unit is formed such that the seals have to be removed when removing the displaceable unit. The housing main member is formed with an outer cup-shaped circumferential wall and with a concentric inner pipe-like connection piece wherein the filter housing with the front end thereof is inserted into the annular space between the circumferential wall and the pipe-shaped connection piece. Therefore at the outside of the filter housing a radial sealing is provided; at the inner side of the filter housing a combined axial and radial sealing is attached. Regarding the fastening of the housing main member at the internal combustion engine only a flat flange connection is disclosed which is visible in the single figure of the drawing in the lower left corner. Therefore in this known liquid filter the connection with the engine block of the associated internal combustion engine is to be attained by an inbetween flat sealing which has to be axially biased.

For guaranteeing the seal of the flange connection between the filter housing and the internal combustion engine during operation over a sufficiently long period of time the material of the housing main member of the filter has to be sufficiently stable which excludes the use of plastic material.

SUMMARY OF THE INVENTION

In accordance with the present invention, a combination filter and connection flange is provided wherein the filter comprises a filter housing having an inner end which is connected to the connection flange and an outer end which is connected to a detachable cover. The cover and filter housing accommodate a filter insert. The inner end of the filter housing includes a filter inlet duct, a filter return duct and a plurality of coaxially spaced radial filter seals which provide a seal between the filter housing and the connection flange. The connection flange includes a connection inlet duct that is in matching registry with the filter inlet duct and a connection return duct that is in matching registry with the filter return duct. The connection flange further includes a plurality of coaxially spaced sealing surfaces, each of which is in matching registry with one of the radial filter seals, which effectively provide a sealed connection between the filter housing and the connection flange.

In an embodiment, the filter return duct is defined by a first cylindrical wall which has a first outer surface with a first peripheral groove for accommodating a first radial filter seal. In turn, the connection return duct comprises a first inwardly facing sealing surface. The first cylindrical wall of the filter return duct matably engages the first inwardly facing sealing surface of the connection return duct with the first radial seal disposed therebetween for a sealed connection. Similarly, the filter inlet duct is disposed between the first cylindrical wall and a second cylindrical wall. The second cylindrical wall includes a second outer surface with a second peripheral groove for accommodating the second radial filter seal. The connection inlet duct comprises a second inwardly facing sealing surface. The second cylindrical wall and the second radial filter seal of the filter inlet duct matably engage the second inwardly facing sealing surface of the connection inlet duct to provide a sealing connection between the filter inlet duct and the connection inlet duct.

In an embodiment, the inner end of the filter housing also includes a filter drain duct and, the connection flange also includes a connection drain duct that is in matching registry with the filter drain duct. The filter drain duct is disposed between the second cylindrical wall and a third cylindrical wall. The third cylindrical wall comprising a third outer surface having a third peripheral groove which accommodates a third radial filter seal. The connection flange includes a third inwardly facing sealing surface which matably receives the third cylindrical wall and third radial filter seal of the filter housing. The third radial filter seal providing a sealed connection between the filter housing and the third cylindrical wall of the connection flange.

In an embodiment, the first, second and third radial filter seals are coaxial but spaced longitudinally from one another so that the first radial filter seal is disposed inwardly toward the connection flange and the third radial filter seal which is disposed outwardly toward the outer housing with the second radial filter seal disposed therebetween. In such an embodiment, the first, second and third inwardly facing sealing surfaces of the connection flange are arranged in a stepwise fashion with the first inwardly facing sealing surface being disposed at an innermost position towards the engine or apparatus, the third inwardly facing sealing surface being disposed at an outermost position towards the filter with the second inwardly facing sealing surface disposed therebetween.

In an embodiment, the first, second and third radial filter seals and the first, second and third inwardly facing sealing surfaces share a common first axis. The outer end of the filter housing and the detachable cover share a second common axis. In an embodiment, the first and second common axes are coincidental. In another embodiment, the first and second common axes are parallel and laterally offset from one another. In still another embodiment, the first and second common axes intersect one another at a non-zero angle. In such an embodiment, the non-zero angle may range from greater than zero to about 135°.

In an embodiment, one or more drain openings may be provided in the filter housing and/or detachable cover.

In an embodiment, an additional locking mechanism may be provided to secure the filter housing against the connection flange. The locking mechanism may also provide a means for securing the filter housing to the connection flange at a plurality of different angles.

In an embodiment, the filter housing and detachable cover may be fabricated from injection molded materials such as metal or plastic.

It is therefore the object to provide a generic liquid filter which for the manufacturing thereof has only little restriction regarding the selection of materials of construction. Furthermore it is an object to provide a liquid filter and a suitable engine-side filter connection which guarantee an easy mounting of the liquid filter and offer a high degree of variance, i.e. in particular the possibility for fastening different liquid filters at a single filter connection flange.

By this embodiment of the liquid filter on the one hand and the suitable engine-side filter connection flange on the other hand, pressing forces required for an axial seal are no longer necessary. Hereby the liquid filter may be manufactured also of less stable and lighter material, in particular plastic material, without endangering the safe operation of the liquid filter. The sealing capacity of the radial sealings according to the invention and the associated radial seal surfaces is attained solely by combining the liquid filter and the engine-side filter connection flange without applying special forces. By this means the fastening means holding the liquid filter at the filter connection flange may be designed simple as they only have to prevent a movement of the liquid filter in axial and circumferential direction of the seal surfaces. It is a further advantage that the engine-side filter connection flange may be manufactured relatively easily because all seal surfaces are concentric radial seal surfaces which may be manufactured in a single operation step with a rotating chip generating tool. This filter connection flange may be universely used as it is independent from the size of the liquid filter fastened thereto by means of a flange, and is usable for different filter embodiments. In total savings in material weight and costs may be achieved in this way.

Furthermore, it is provided that the liquid inlet duct and the liquid return duct open into separate, flangeside, concentric duct end areas, wherein the duct end areas are confined by walls with concentric outer circumference surfaces, and wherein the seals, as radial sealing rings, are arranged in grooves in the outer circumference surfaces. This embodiment of the liquid filter provides for a simple manufacturing and mounting as the seal rings are easy to be mounted, and are visible from the outside when mounting the liquid filter and the associated filter connection flange such that errors during mounting are avoided to a large extent.

To remove the filter insert from the liquid filter without leakage, it is provided for protecting the environment that radially outwards of the duct end areas additionally a liquid drain duct opens for draining the filter housing before replacing the filter insert with the liquid drain duct radially outwards confined by a further wall with an outer circumference surface concentric with the outer circumference surfaces, wherein a further seal as a radial sealing ring is inserted in a groove in the outer circumference surface, wherein the seal cooperates with the sealing surface of the engine-side filter connection flange, and wherein the liquid drain duct corresponds with the drain duct in the filter connection flange. Also with this embodiment of the liquid filter with an additional liquid drain duct, the advantages described above remain such that in spite of this additional function the construction remains simple.

In order to manufacture the filter housing of the liquid filter as simply as possible and thereby to save time and costs, it is proposed, that the seals at the filter housing as viewed in axial direction are spaced from each other, wherein as viewed from radially outwards to inwards, the seals protrude in the direction towards the filter connection flange, and wherein the sealing surfaces corresponding therewith are arranged in steps in the engine-side filter connection flange. For practical reasons the spacing or stepping, respectively, is selected such, that the grooves in radial direction outwards are freely accessible. Thereby an easy access for mounting the sealing rings is guaranteed. Furthermore the access of tools or the removal of the filter housing out of the mould during the manufacturing thereof is much simply-fied.

In a first comparably simple embodiment, the middle axis of the concentric outer circumference surfaces, and the longitudinal middle axis of the liquid filter coincide. In this embodiment, the position of the liquid filter on the filter connection flange is independent from the rotational position in circumferential direction.

An alternate embodiment provides that the middle axis of the concentric outer circumference surfaces and the longitudinal middle axis of the liquid filter extend in a parallel offset relationship. Hereby the possibility is created to change the position of the liquid filter in relation to the filter connection flange by rotation, e.g. to achieve the optimal position relative to the corresponding mounting situation.

A further alternate embodiment provides, that the middle axis of the concentric outer circumference surfaces, and the longitudinal middle axis of the liquid filter form an angle α unequal zero with each other. An angle α up to 135° is preferred. Hereby advantageously the liquid filter may be put in the desired position by rotating it in relation to the filter connection flange, e.g. a position wherein the automatic drain of the filter housing when replacing the filter insert is possible and/or wherein a given space e.g. the engine space of a passengers car may be optimally used.

In applications of the liquid filter wherein the filter is mounted in an approximately horizontal position of the longitudinal middle axis or in a position pointing downwards or in an angle downwards it is provided that the liquid filter comprises a liquid drain opening selectively to be opened and closed during operation in the circumference wall or in the cover thereof. This embodiment of the liquid filter enables a drain of the interior of the filter housing before replacing the filter insert in order to remove and dispose the filter insert without leakage even in such an arrangement, which prevents a drain through the liquid drain duct in the filter connection flange. In the most simple case the liquid drain opening is formed by a threaded bore which during operation of the liquid filter is closed by a screw bolt and a seal. Before replacing the filter insert the liquid drain opening may be opened by turning out the screw bolt, and the liquid may be drained out of the interior of the liquid filter. As an alternate the liquid drain opening at the outside thereof may be connected with a liquid duct which is guided into a liquid reservoir for which reason at the liquid drain opening a closing means, e.g. a small check valve which is accessible from the outside may be provided.

A further development of the liquid filter and the filter connection flange provides locking means arranged at or in engagement with the outer circumference of the filter housing with the locking means serving for securing the filter housing at the filter connection flange to avoid movements in axial and circumferential direction. Hereby, the locking means are accessible from the outside thereby simplifying the handling and actuation. Furthermore the liquid filter may be mounted completely, i.e. in the closed position thereof with a mounted cover thereby avoiding contamination of the filter interior and speeding up the mounting operation.

In order not to restrict the variable positioning of the liquid filter in circumferential direction in relation to the filter connection flange by the locking means as described above, it is provided that the filter housing is secureable at the filter connection flange in several angle positions as viewed in circumferential direction in relation to the filter connection flange. Suitable locking means which are simply constructed and easy to handle are known to the expert from other fields of application and must not be further explained here.

To enable an inexpensive mass production, e.g. for fuel and oil filters for internal combustion engines of vehicles it is preferably provided that the filter housing and the cover are injection moulding parts of metal or plastic material.

When necessary the liquid filter according to the invention may be combined with a heat exchanger as it is known as such. Selectively the heat exchanger may be arranged laterally at the liquid filter or between the filter connection flange and the liquid filter. There is also the possibility to design the heat exchanger between the filter connection flange and the liquid filter simultaneously as an angle adaptor or to arrange an angle adaptor as such between the filter connection flange and the liquid filter. The connection ends of the heat exchanger and/or angle adaptor for practical reason are designed corresponding with the filter connection flange and the connection end of the liquid filter to enable a universal use corresponding to a building block system.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
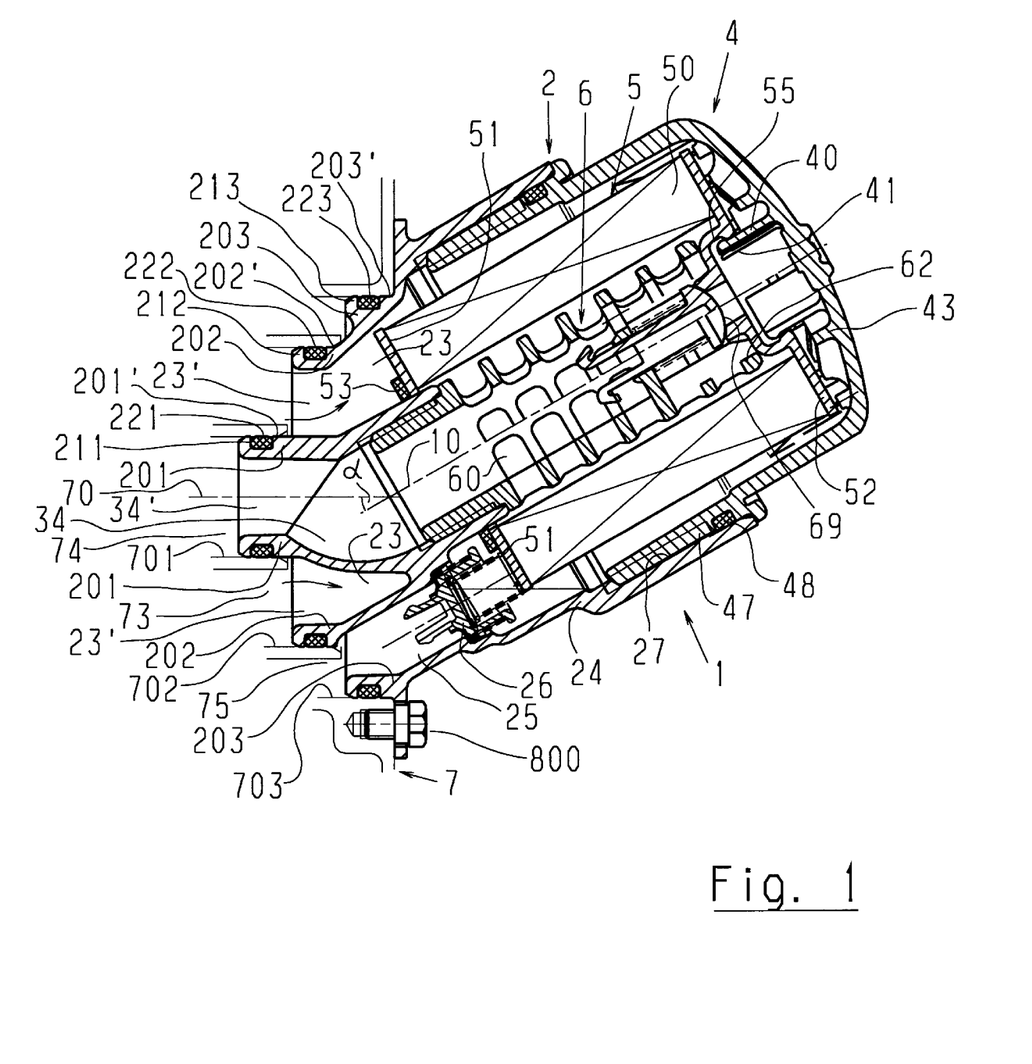
FIG. 1 is a side sectional view of a filter and connection flange made in accordance with the present invention taken substantially along line I—I of FIG. 3.

FIG. 1 of the drawing illustrates as an embodiment a liquid filter 1 for the mounting with a filter longitudinal axis 10 extending in an angle upwards. The liquid filter 1 comprises a substantially cup-shaped filter housing 2 which is formed by a circumference wall 24 and several walls 201, 202, 203 forming a connection member. The material of the filter housing 2 preferably is light metal or plastic material, and the manufacturing is preferably attained as an injection moulding or diecasting part, respectively.

The walls 201, 202, 203 at the front side thereof each comprise cylindrical concentric outer circumference surfaces 201', 202', 203'. The inner wall 201 as viewed in radial direction encompasses a return duct end area 34', the middle wall 202 as viewed in radial direction encompasses an inlet duct end area 23'. The outmost wall 203 as viewed in radial direction confines a drain duct 25 extending only through the deepmost area of the filter housing 2 in the mounted condition of the liquid filter.

Furthermore FIG. 1 illustrates that in each of the outer circumference surfaces 201', 202', 203' a circular groove 211, 212, 213 is machined, in which each a sealing ring 221, 222, 223 as a radial sealing ring is inserted. The walls 201 to 203 and the associated radial seals 221 to 223 are arranged such that as viewed in axial direction along the middle axis 70 they are positioned in different planes. Therein the front ends of the walls 201 to 203 are stepped back as viewed from inside to outside.

In the left part of FIG. 1, a filter connection flange 7 in section is illustrated which e.g. is a part of an engine block of an internal combustion engine. In the central part of the filter connection flange 7 there is a return duct 74 which is in streaming connection with the return duct end area 34' of the liquid filter 1. Towards the outside the return duct 74 in the filter connection flange 7 is confined by a cylindrical seal surface 701 cooperating in a sealing fashion with the seal 221. Outwards in radial direction a concentric inlet duct 73 abuts at the return duct 74 with the inlet duct 73 radially outwards also confined by a cylindrical seal surface 702 cooperating with the seal 222. This inlet duct 73 is in streaming connection with the inlet duct end area 23' of the liquid filter 1. Finally in the lower part of the filter connection flange 7, there is a drain duct 75 which is in streaming connection with the drain duct 25 of the liquid filter 1. Also in this case, the sealing is attained by a cooperation of a cylindrical seal surface 703 with the seal 223 at the wall 203 of the filter housing 2.

At the side pointing towards the right upper direction the filter housing 2 is designed open and comprises at the inner side of the circumference wall 24 thereof an inner thread 27. In this inner thread 27, a cover 4 is screwed by means of a suitable outer thread 47 and by using a further sealing ring 48 in a sealing fashion.

Furthermore, in the interior of the liquid filter 1, a filter insert 5 is arranged which in this case is formed of a zigzag-shaped foulded filter material body 50 which at the lower and upper side is each connected with a front disc in a sealing fashion, e.g. glued or bonded or cast. Both front discs 51, 52 have a circular shape. The lower front disc 51 at the radial inner edge thereof carries a seal 53 by means of which the front disc 51 is inserted on a connection piece in the filter housing 2 in a sealing fashion.

The upper front disc 52 of the filter insert 5 is comprised with snap-in means 55 pointing to the cover 4, with the snap-in means 55 cooperating with snap-in locks 41 which are fastened at snap-in tongues 40 of the cover 4. By this means a snap-in connection between the filter insert 5 and the cover 4 is attained which provides for a transport of the filter insert 5 out of the filter housing 2 when taking off the cover 4 and which when required is easily detachable in particular when replacing the filter insert 5.

In the interior of the filter body 5, a central support body 6 is arranged which comprises a substantially hollow cylindrical grid-like structure and serves for supporting the inner circumference of the filter material body 50 in order to prevent the collapsing under the pressure of the liquid streaming through the filter insert 5 from outwards to inwards. The apertures 60 in the support body 6 enable an unrestricted liquid penetration into the interior thereof. With the lower end, the support body 6 is screwed in the connection piece in the interior of the filter housing 2 by means of a suitable thread.

In the interior of the support body 6 at the upper end thereof, a bypass valve 69 is mounted which opens a direct streaming connection between the inlet or crude side and the return or clean side of the liquid filter 1 when the pressure decrease across the filter insert 5 surpasses a threshold value. The bypass valve 69 as a prefabricated member is inserted into the support body 6 from the free end thereof and is snapped in. The valve seat cooperating with the bypass valve 69 as formed as a part of the upper front disc 52 in the central area thereof.

In the lower part of FIG. 1, within the filter housing 2, a drain valve 26 is visible which in the illustrated condition of the liquid filter 1 with a mounted filter insert 5 is secured by the lower front disc 51 in closed position. When screwing off the cover 4 and removing the filter insert 5 out of the filter housing 2 the drain valve 26 is automatically moved into the open position thereof by a spiral spring whereby a streaming connection to the drain duct 25 is opened. Through the drain duct 25 positioned in the filter connection flange 5 and connected with the drain duct 25 the liquid in the interior of the filter housing 2 streams out into a reservoir e.g. the oil sump or the fuel tank of a passenger car.

As illustrated in FIG. 1, the filter connection flange 7 is placed in a substantially vertical plane. In order to guarantee a complete drainage of the filter housing 2 before changing the filter insert 5, it is meaningful that the longitudinal axis 10 of the liquid filter 1 extends in an angle upwards. By this means the longitudinal middle axis 10 and the middle axis 70 of the concentric outer circumference surfaces 201' to 203' form an angle a with each other. This angle a in the embodiment illustrated is about 30°, in practical experience the angle a may be substantially larger with values up to about 135° occuring dependent from the mounting situation.

When mounting the liquid filter 1 to the filter connection flange 7 it is sufficient to move the liquid filter 1 in the direction of the axis 70 into the filter connection flange 7 and thereafter to select the desired position after rotating in circumferential direction and secure it by suitable locking means shown by the lock screw 800.

During operation of the liquid filter 1 the liquid to be filtered streams through the inlet duct 73 of the filter connection flange 7, the inlet duct end area 23' and an inlet duct 23 of the filter housing 2 to the outer circumference of the filter insert 5. After the streaming of the liquid through the filter material body 50 and separation of contaminants the liquid streams into the interior of the support body 60 and streams in the interior towards the left down area into a return duct 34 and then through the end area 34' thereof into the return duct 74 of the filter connection flange 7.

Figure 2:
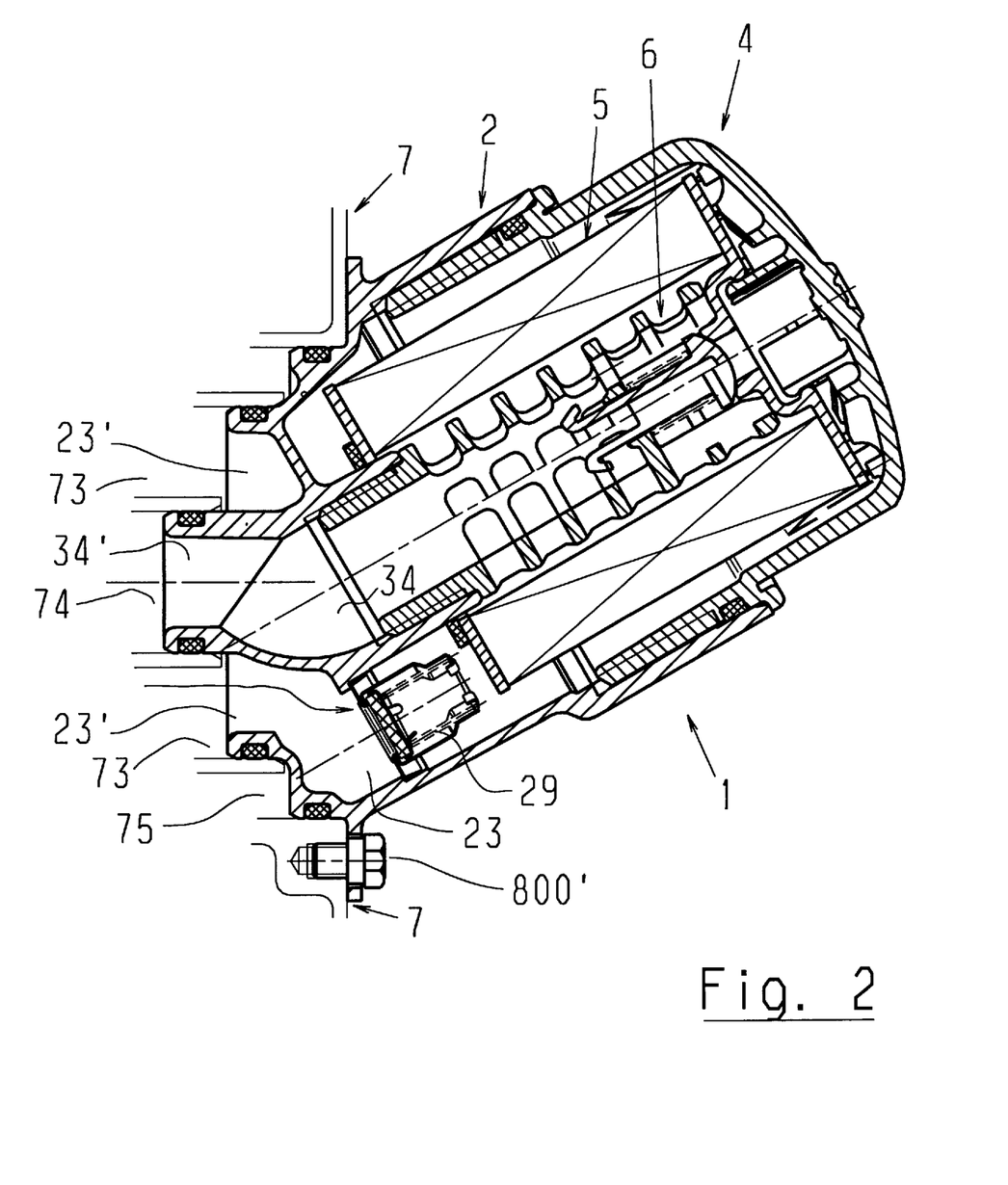
FIG. 2 is another side sectional view of the filter and connection flange first shown in FIG. 1 and taken substantially along line II—II of FIG. 3.

FIG. 2 of the drawing illustrates the same liquid filter 1 as in FIG. 1, however, with a changed section. The course of the sections, which are illustrated in FIGS. 1 and 2 are illustrated in FIG. 3 wherein with the line I—I the section in FIG. 1 and with the line II—II the section in FIG. 2 is illustrated.

Also in FIG. 2 the liquid filter 1 is inserted into the filter connection flange 7 and reference is taken regarding the numerals to the description of FIG. 1.

It is a novelty of FIG. 2 versus FIG. 1 that now in the lower part of the Figure a return check valve 29 is visible which is arranged in the course of the inlet duct 73 between the end are 23' thereof and the outer circumference of the filter insert 5. This return check valve 29 will open under pressure of the liquid to be filtered streaming through the duct 23 and a flow in the opposite direction is prevented by the return check valve 29. A second lock screw is shown at 800'.

Figure 3:
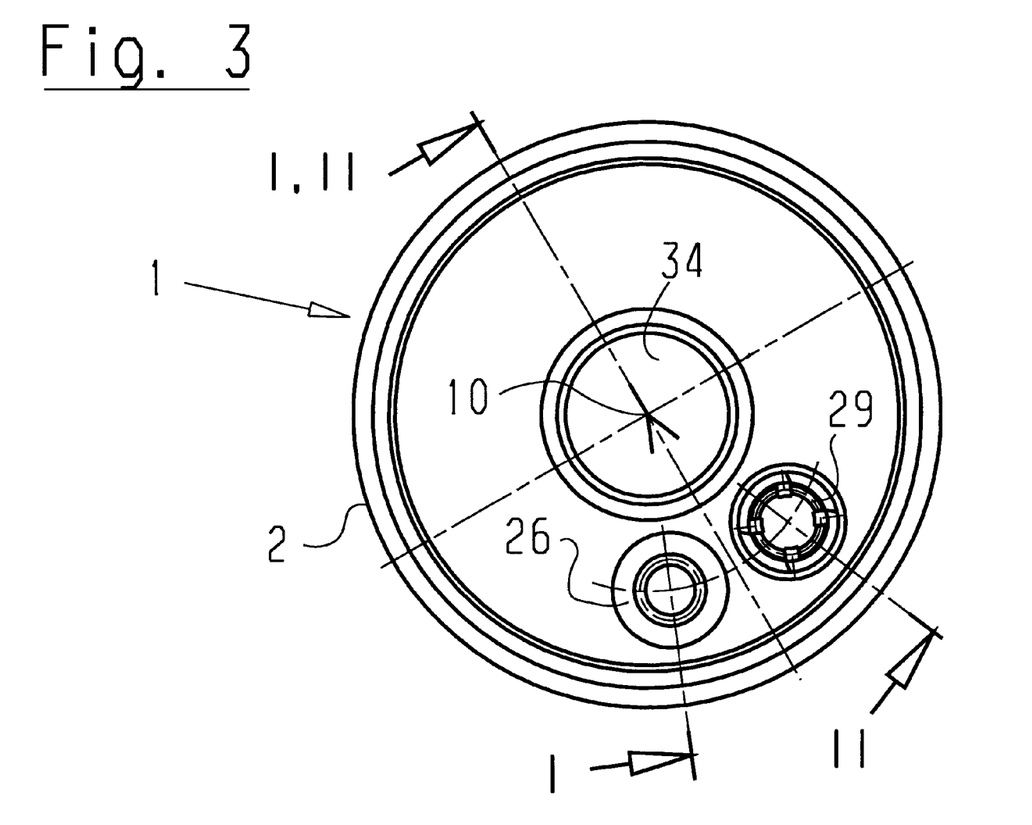
FIG. 3 is an end view of the filter first shown in FIG. 1.

FIG. 3 of the drawing illustrates the relative position of the return check valve 29 and the drain valve 26 in the interior of the filter housing 2 of the liquid filter 1. It is especially obvious that the drain valve 26 is substantially positioned in the deepest part of the filter housing 2 in the mounted condition of the liquid filter 1.

In the middle of FIG. 3, the longitudinal middle axis 10 of the liquid filter 1 extends concentrically about the longitudinal middle axis there is the return duct 34. Outside about the return duct 34 there is the space for receiving the filter insert 5 above the return duct 34 where the central support body 6 is arranged. These parts and the cover 4 are removed in FIG. 3 such that there is a free view down to the bottom of the filter housing 2.

Figure 4:
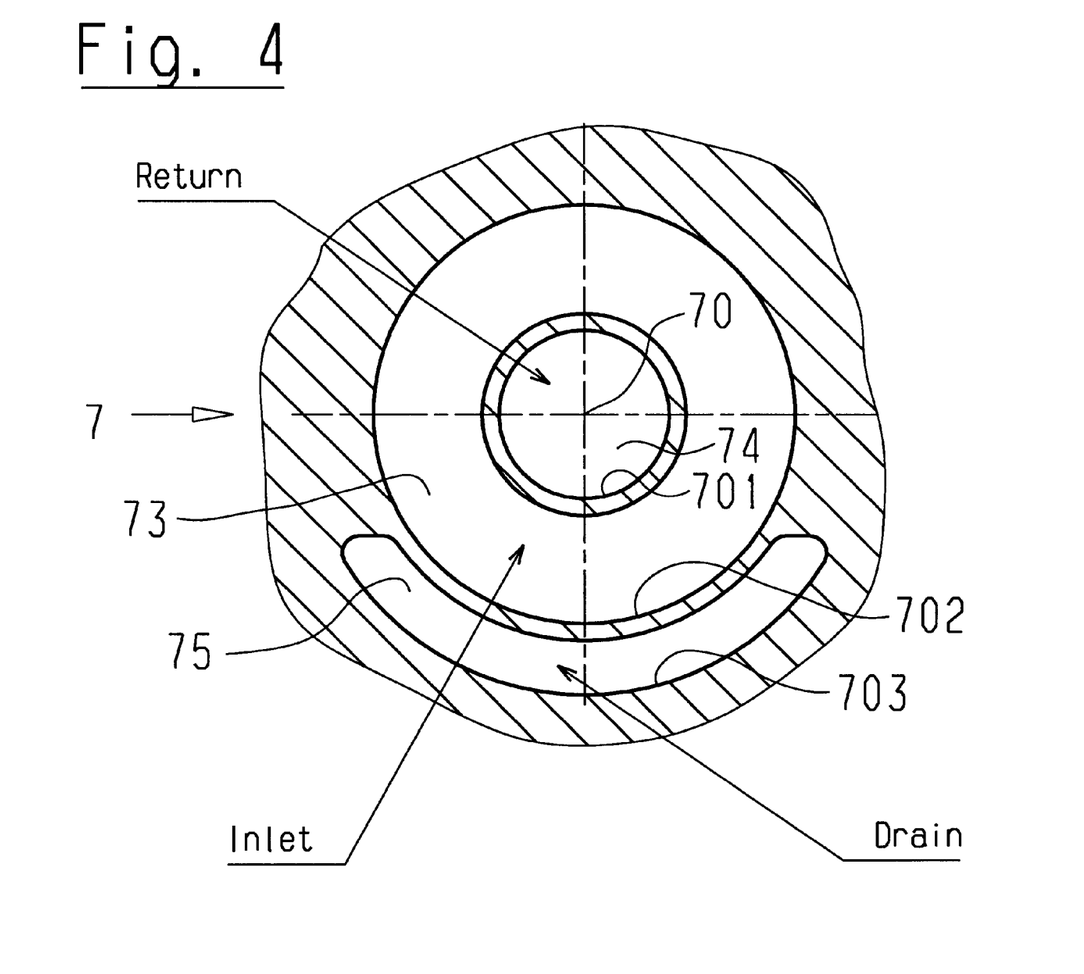
FIG. 4 is an elevational view of the connection flange first shown in FIG. 1.

FIG. 4 of the drawing illustrates a section through the engine-side filter connection flange 7. The middle axis 70 of the concentric seal surfaces 701 and 702 extends through the middle of FIG. 4. In the central area of the filter connection flange 7 there is the liquid return duct 74 which in the example illustrated is an oil return duct. Radially outwards in concentric arrangement there is the liquid inlet duct 73, which in the example shown is an oil inlet. Outwards this oil inlet is confined by the cylindrical seal surface 27 concentric with the seal surface 701.

Below the liquid inlet duct 73 there is the liquid drain duct 75 which in this case comprises the form of a ring section. Radially outwards the liquid drain duct 75 is confined by the concentric seal surface 37 which is concentric with the seal surfaces 701, 702. As for the liquid drain out of the liquid filter a position of the drain duct 75 as deep as possible in relation to the filter housing 2 is required it is sufficient when the liquid drain duct 75 in the filter connection flange 7 is only provided in the lower area thereof as illustrated in FIG. 4. However, to achieve a sealing engagement of the radial outer seal 223 of the liquid filter 1 it is required that the seal surface 703 extends in a plane above the plane over the total circumference of the drawing in FIG. 4 as it is illustrated in the FIGS. 1 and 2 in the upper left part.

Figure 5:
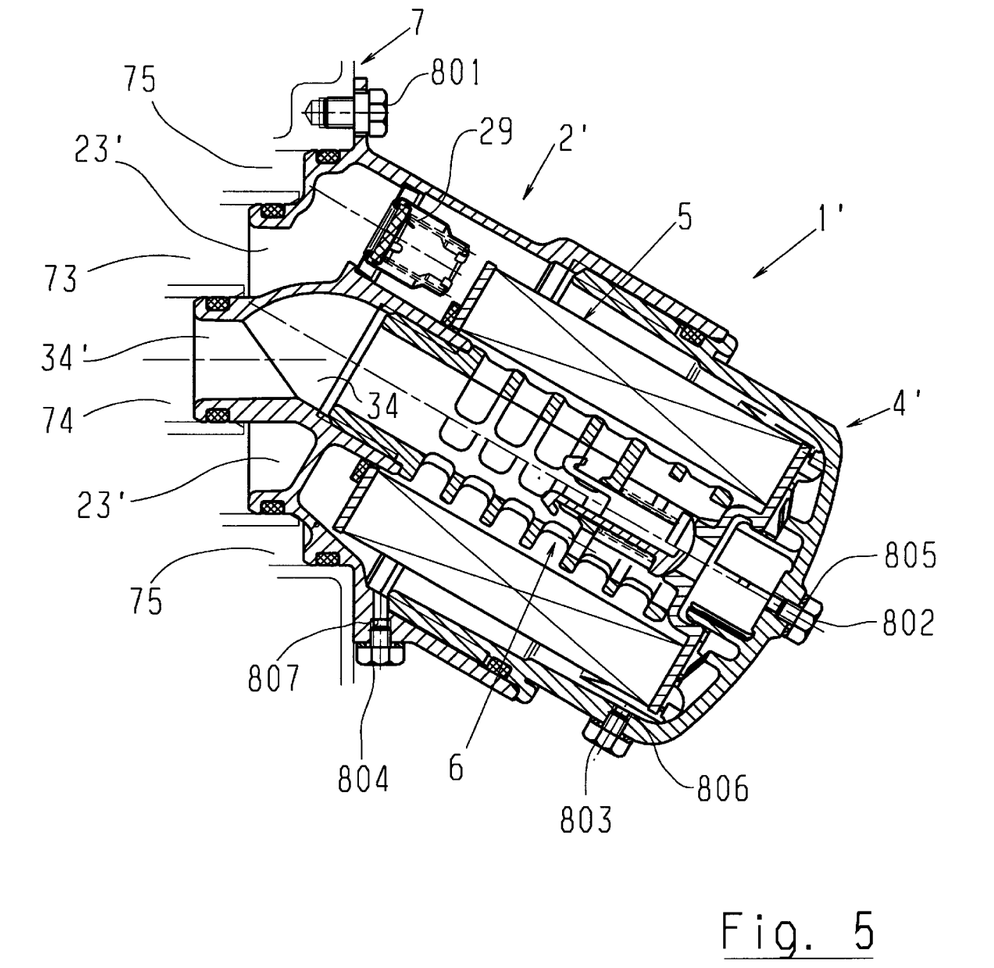
FIG. 5 is a side sectional view of an alternative embodiment of a filter and connection flange made in accordance with the present invention.

FIG. 5 illustrates an additional filter 1' that includes a housing 2' with a drain plug 804 and a cover 4' with drain plugs 802 and 803. The filter 1' is preferably disposed so that it is angled downward as shown in FIG. 5 so as to facilitate the draining of liquid through the openings 805, 806 and 807.

Figure 6:
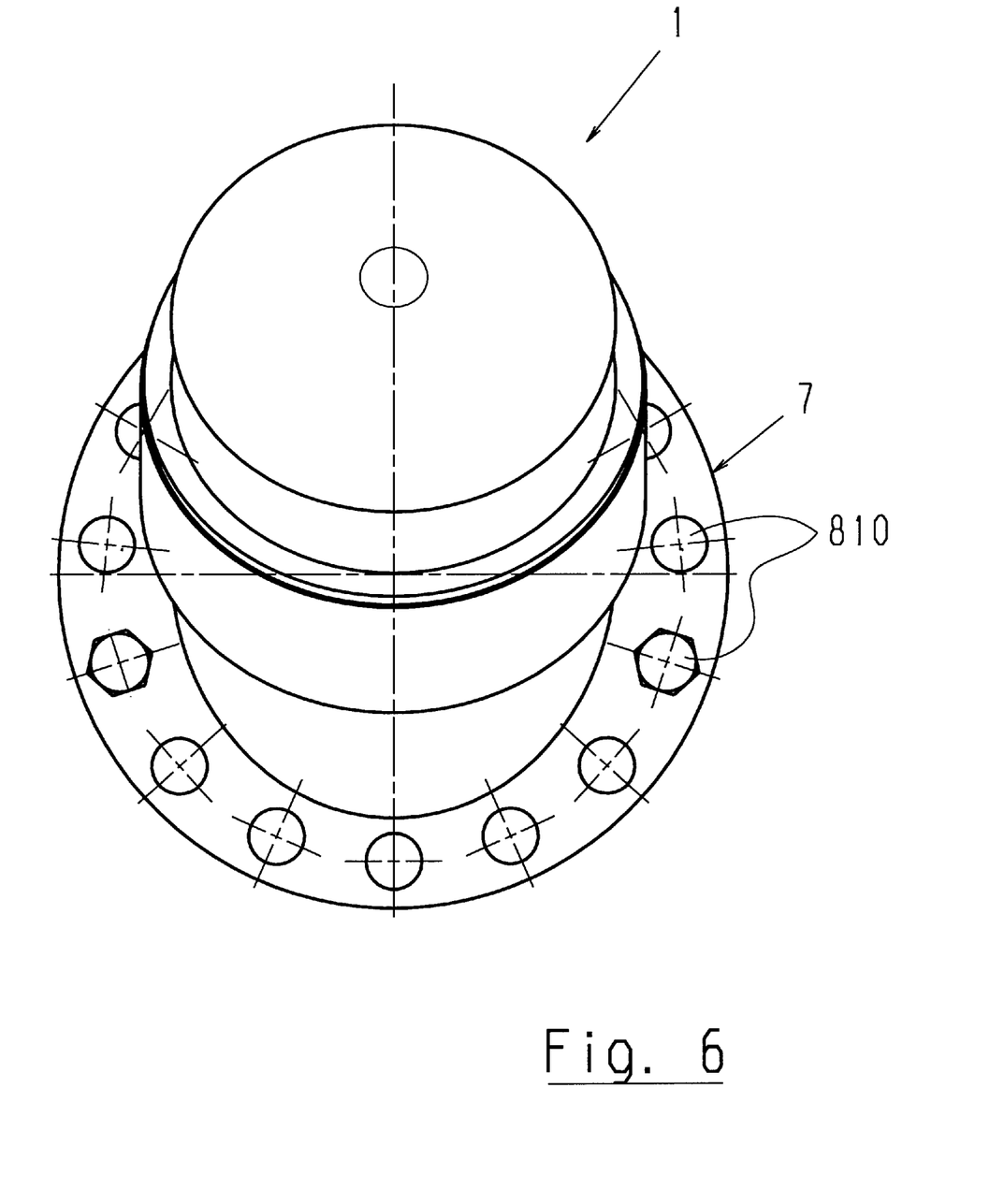
FIG. 6 is an elevational view illustrating an alternative embodiment of a connection flange made in accordance with the present invention.

Turning to FIG. 6, a connecting flange 7' is illustrated with a plurality of threaded holes shown at 810 for mounting the filter 1 to the connecting flange 7' at a variety of angular positions. In other words, the filter 1 can be mounted to the flange 7' so that it is directed upward as shown in FIGS. 1 and 2 or so that it is directed downwards as shown in FIG. 5.

Although modifications and changes may be suggested by those skilled in the art, it is the intention of the inventor to embody within the patent warranted hereon all changes and modifications as reasonably and properly come within scope of his contribution to the art.

I claim:

1. A combination of a filter and a connection flange, the combination comprising:

a filter comprising a filter housing comprising an inner end for connection to a connection flange and an outer end connected to a detachable cover, the inner end comprising a filter inlet duct, a filter return duct and a plurality of coaxially spaced radial filter seals for providing a seal between the filter housing and the connection flange, the filter further comprising a removable filter insert;

the connection flange comprising a connection inlet duct in matching registry with the filter inlet duct and a connection return duct in matching registry with the filter return duct, the connection flange further comprising a plurality of coaxially spaced sealing surfaces, each sealing surface being in matching registry with one of said radial filter seals;

the radial filter seals comprising a first radial filter seal and a second radial filter seal;

the filter return duct is defined by a first cylindrical wall surrounding a first axis having a first radially outer surface with a first peripheral groove therein for accommodating the first radial filter seal, the connection return duct comprising a first radially inwardly facing sealing surface, the first cylindrical wall and the first radial filter seal matably engaging the first radially inwardly facing sealing surface of the connection return duct of the connection flange;

a second cylindrical wall surrounding said first cylindrical wall, the filter inlet duct is disposed between the first cylindrical wall and the second cylindrical wall, the second cylindrical wall comprising a second radially outer surface with a second peripheral groove therein for accommodating the second radial filter seal, the connection inlet duct comprising a second radially inwardly facing sealing surface, the second cylindrical wall and the second radial filter seal matably engaging the second radially inwardly facing sealing surface of the connection inlet duct of the connection flange, wherein said filter housing can be rotated about said first axis with respect to said connection flange to a plurality of angular positions; and locking means for securing the filter housing against the connection flange, wherein said locking means secures said filter housing against rotation about said first axis with respect to the connection flange, and wherein said locking means permits said filter housing to be rotationally secured at a plurality of said angular positions with respect to said connecting flange.

2. The combination filter and connection flange of claim 1 wherein the connection flange is further characterized as being a filter connection flange of an internal combustion engine.

3. The combination of a filter and a connection flange of claim 1 wherein the filter inlet duct is disposed radially outward from the filter outlet duct, and the inner end of the filter housing further comprises a filter drain duct, the filter drain duct being disposed radially outward from the filter inlet duct, the filter drain duct being disposed between the second cylindrical wall and a third cylindrical wall, the third cylindrical wall comprising a third radially outer surface having a third peripheral groove therein, the third peripheral groove accommodating a third radial filter seal, and the connection flange comprising a connection drain duct in matching registry with the filter drain duct, the connection flange further comprising a third inwardly facing sealing surface, the third inwardly facing sealing surface matably receiving the third radially outer surface and third radial filter seal of the filter housing.

4. The combination filter and connection flange of claim 3 wherein the second radial filter seal is longitudinally disposed with respect to said central axis between the first and third radial filter seals and third radial filter seal is longitudinally disposed with respect to said central axis between the second radial filter seal and the detachable cover.

5. The combination of a filter and a connection flange of claim 3, wherein the first, second, and third inwardly facing surfaces and the first, second, and third radial seals are coaxially disposed about said central axis, the outer end of the filter housing and detachable cover, the first and second common axes intersecting at a non-zero angle with respect to one another.

6. The combination filter and connection flange of claim 5 wherein the angle ranging from greater than 0° to about 135°.

7. The combination filter and connection flange of claim 1 wherein the cover further comprises a drain opening that can be selectively opened and closed.

8. The combination filter and connection flange of claim 1 wherein the filter housing further comprises a drain opening that can be selectively opened and closed.

9. The combination filter and connection flange of claim 1 wherein the filter housing and the cover are formed from a plastic.

10. The combination filter and connection flange of claim 1 wherein the filter housing and the cover are formed from a metal.

* * * * *